United States Patent
Henry

[19]
[11] Patent Number: 6,131,192
[45] Date of Patent: Oct. 10, 2000

[54] SOFTWARE INSTALLATION

[75] Inventor: Craig James Henry, Woodinville, Wash.

[73] Assignee: Microsoft Corporation, Redmond, Wash.

[21] Appl. No.: 09/099,903

[22] Filed: Jun. 18, 1998

[51] Int. Cl.[7] .................................................. G06F 9/445
[52] U.S. Cl. .............................. 717/11; 707/101; 707/203
[58] Field of Search ................................ 395/712; 713/1, 713/100, 101; 707/100, 200, 203, 205; 711/170, 171, 205

[56] References Cited

U.S. PATENT DOCUMENTS 5,999,740  12/1999  Rowley ..................................... 395/712

*Primary Examiner*—Tariq R. Hafiz
*Assistant Examiner*—Kakali Chaki
*Attorney, Agent, or Firm*—Jones & Askew LLP

[57] ABSTRACT

An executable file contains materials necessary for the installation of a software product, and the executable file is executed to provide a compressed file and a shell program module. The shell program module locates a suitable temporary storage space, extracts the compressed file from the initial executable file, and places the compressed file in the temporary storage space. The initial executable file causes a second executable file to be extracted from the compressed file and executed, so that a setup program module is run. In response to execution of the setup program module, files are sequentially decompressed from the compressed file. A newly decompressed file may initially be placed in the temporary storage space, and the decompressing is paused until that newly decompressed file is copied to a target storage space. The newly decompressed file may be renamed or decompressed while being copied to the target storage space. Thereafter, that newly decompressed file is deleted from the temporary directory. This process is repeated until multiple files originating from the compressed file are in their respective directory of a directory tree created in the target directory. Alternatively, newly decompressed files may be placed directly in the target storage space. Thereafter, the setup program module prepares the data and information on the computer so that the software product will work with the computer and its attached devices. Once the setup program module is no longer running, files remaining in the temporary storage space as a result of execution of the shell program module are deleted from the temporary storage space, and execution of the shell program module is terminated.

15 Claims, 6 Drawing Sheets

SOFTWARE INSTALLATION

TECHNICAL FIELD

The present invention relates to software installation, and more particularly to an executable file that contains the software materials necessary for the installation of a software product.

BACKGROUND OF THE INVENTION

There are numerous methods for installing software products on computers. For example, it is conventional to install a software product on a computer by using a set of diskettes that contain the software materials necessary for the installation of the software product. The first diskette typically includes a setup program and a compressed file. Execution of the setup program causes files to be decompressed from the compressed file on the first diskette, and those decompressed files are placed in a target directory of the computer. When decompression from the first disk is complete, the setup program prompts for the second diskette, and the setup program causes files to be decompressed from a compressed file on the second diskette, and those decompressed files are also placed in the target directory. This may continue for several diskettes. In addition to decompressing files from the diskettes, the setup program guides the user through, or otherwise handles, the process of setting up the software product, which is a conventional process for preparing the data and information on the computer so that the software product will work with the computer and its attached devices. For example, the setup program may modify the computer's configuration files, which reside on the computer irrespective of the software product being installed. The software product can typically be executed in a conventional manner, once the setup program has been completely executed.

It is also conventional to install a software product on a computer by using a compact disk that contains the software materials necessary for the installation of the software product. Installation with a compact disk is similar to installation with diskettes, except that the compressed files that are typically spread across several diskettes may each be included on a single compact disk. Further, after decompressing files from a first compressed file on the compact disk to the target directory, the setup program typically proceeds automatically to decompress files from subsequent compressed files on the compact disk.

Numerous steps have been taken to simplify and streamline the process of installing a software product on a computer. For example, it is now conventional to have a single executable file that contains the software materials necessary for the installation of a software product. The single executable file can be transferred from a source, such as a website on the Internet, to any disk drive that can be written to and is associated with the computer to which the software product is to be installed.

One type of conventional single executable file is the source of a tree of files and a program, which may be referred to as the shell program. The tree of files may be compressed into the single executable file during the original creation of the single executable file. That compression can be facilitated by a utility program or runtime library.

While the single executable file is on a disk drive associated with the computer to which the software product is to be installed, the person using the computer can select the single executable file to initiate execution of the shell program. The shell program may designate a predefined location on a disk drive associated with the computer, such as a temporary directory that is established by the WINDOWS brand operating system sold by Microsoft Corporation of Redmond, Wash., and the temporary directory may be examined in an effort to determine if it has sufficient free space to accommodate the tree of files. If sufficient space is available, the shell program causes the tree of files to be extracted from the single executable file, and the tree of files is placed in the temporary directory.

Some of the files of the tree of files placed in the temporary directory may be individually compressed, such that the tree of files in the temporary directory contains compressed files. One of the files of the tree of files is an executable file, the execution of which causes a setup program to run. The setup program must be run to set up the software product. Some conventional shell programs initiate execution of the setup program. In contrast, other conventional shell programs do not initiate execution of the setup program, such that a user must initiate execution of the setup program in order to set up the software product.

The setup program guides the user through the process of setting up the software product, which is a conventional process for preparing the data and information on the computer so that the software product will work with the computer and its attached devices. For example, the setup program copies the tree of files from the temporary directory to a target directory, may cause individually compressed files of the tree of files to be decompressed, and may modify the computer's configuration files, which reside on the computer irrespective of the single executable file. Typically, the tree of files in the temporary directory varies from the subsequent tree of files in the target directory. This variation may be because some of the files in the tree of files in the temporary directory are decompressed before they are placed in the target directory. Because an entire tree of files is placed in the temporary directory, and the tree of files is copied to the target directory, a large amount of space is required for installation of the software product.

Once the software product is installed, there is no need for the tree of files in the temporary directory. For some software products, is it conventional for the shell program or setup program to remove the tree of files from the temporary directory, whereas for other software products the tree of files is not automatically removed from the temporary directory. Thus, in some circumstances the user must delete the temporary tree of files from the temporary directory if it is desired to free-up storage space. Some users may not know that is okay to delete the temporary tree of files from the temporary directory.

It is conventional to determine if there is sufficient free space to accommodate the tree of files to be extracted from the single executable file by comparing the total number of bytes that define the tree of files, when extracted, to the number of bytes of free space available in the temporary directory. For example, if the extracted tree of files consists of 10 megabytes, it will be assumed that there is sufficient free space if 10 megabytes of free space is available in the temporary directory. However, for at least some conventional single executable files, the extraction of the tree of files from the single executable file will fail even if the analysis indicates that there is sufficient space in the temporary directory for the tree of files, because the WINDOWS brand operating system writes out each file to the end of a cluster boundary. If the analysis indicates that there is sufficient space, but there are not enough clusters due to the writing of each file to the end of a cluster boundary, the extraction will fail part way through the processing.

Numerous problems can be encountered when downloading and installing software as described above. For example, the tree of files initially extracted from the single executable file may require a large amount of storage space which may not be available. Further, it is common for a shell program to perform an analysis that incorrectly determines whether there is sufficient free space to accommodate the tree of files extracted from the single executable file, because the shell program does not consider clusters, which may cause the installation of the software product to fail. Further, the shell programs associated with the installation of some software products do not initiate execution of the corresponding setup program that must be executed to set up the software product. Moreover, neither the shell program nor the setup program associated with the installation of some software products operate to remove the tree of files initially extracted from the single executable file and placed in the temporary directory. Thus, it is common with the installation of some software products to leave the tree of files in the temporary directory, even though those files are not used after the software product has been installed. Retaining such unused files is certainly inefficient use of storage space.

Therefore, there is a need in the art for an improved executable file that contains the software materials necessary for the installation of a software product on a computer, and that, once executed, searches for and uses only a small amount of temporary storage space in the process of getting the files of the software product in the target directory, causes the software product to be set up on the computer, and that cleans-up the temporary storage space.

SUMMARY OF THE INVENTION

The present invention satisfies the above-described needs by providing an improved single executable file, referred to as the initial executable file, that contains the software materials necessary for the installation of a software product on a computer, and that, once executed, searches for and uses only a small amount of temporary storage space in the process of getting the files of the software product in the target directory, causes the software product to be set up on the computer, and thereafter cleans-up the temporary storage space.

In accordance with one aspect of the present invention, the single executable file can be transferred from a source, such as a website on the Internet, to any storage space, such as a disk drive or other computer readable storage media, that can be written to and is associated with the computer to which the software product is to be installed. The initial executable file is the source of a compressed file and a program module, which may be referred to as the shell program module. The compressed file that originates from the initial executable file is the source of series of files of the software product.

In accordance with another aspect of the invention, while the initial executable file is in the storage media associated with the computer to which the software product is to be installed, the person using the computer can select the initial executable file to initiate execution of the shell program module. The shell program module locates a suitable temporary storage space, extracts the compressed file from the initial executable file, and places the compressed file in the temporary storage space. The initial executable file decompresses a setup program module from the compressed file and causes the setup program module to be executed.

The setup program module creates a directory tree in the target storage space, and thereafter the setup program module calls a decompression module to sequentially decompress files of the software product from the compressed file. A newly decompressed file may be initially placed in the temporary storage space, and the decompressing from the compressed file is paused until that newly decompressed file is copied to the target storage space. In conjunction with being copied to the target storage space, the newly decompressed file may be renamed. Thereafter, that newly decompressed file is deleted from the temporary storage space, so that a minimum amount of space is required in the temporary storage space. This process is repeated until multiple files originating from the compressed file are in their respective place in the directory tree created in the target storage space. Thereafter, the setup program module prepares the data and information on the computer so that the software product will work with the computer and its attached devices.

In accordance with another aspect of the invention, when the setup program module calls the decompression module to sequentially decompress files of the software product from the compressed file, the newly decompressed files are placed directly into the target storage space. Prior to placing a newly decompressed file into the target storage space, the target storage space is scanned to determine if a prior file having the same name as the newly decompressed file is in the target storage space. If so, the newly decompressed file is renamed with a temporary name and then placed in the target storage space. Then, the version information of the prior file and the newly decompressed file are compared. If the newly decompressed file is newer than the prior file, the prior file is deleted and the newly decompressed file is given the name of the deleted file.

In accordance with another aspect of the invention, the shell program module transitions from being executed in the foreground to being executed in the background during execution of the setup program module. Once the setup program module is no longer running, the shell program module transitions from being executed in the background to being executed in the foreground. Thereafter, the shell program module deletes the files remaining in the temporary storage space as a result of the execution of the shell program module. Thereafter, execution of the shell program module is terminated.

In accordance with another aspect of the invention, when the initial executable program module searches for temporary storage space, it is determined whether the capacity of a section of the storage media is at least as large as a predetermined capacity that is representative of the amount of storage space required to accommodate at least the compressed file and a file from which the setup program module originates. This determination is preferably made by determining the number of empty clusters in the section of the storage media, and comparing that number to the number of clusters required to accommodate at least the compressed file and the file from which the setup program module originates.

The various aspects of the present invention may be more clearly understood and appreciated from a review of the following detailed description of the disclosed embodiments and by reference to the appended drawings and claims.

DETAILED DESCRIPTION

The present invention is directed toward a method for installing a software product. In one embodiment, the invention may be used to facilitate installation of trial versions of software products that are in the form of software games, such as the Puzzle Collection Trial Version, the Age of Empires Trial Version, Close Combat—A Bridge Too Far Trial Version, and CART Precision Racing Trial Version, all of which are available from Microsoft Corporation of Redmond, Wash., and all of which operate in the WINDOWS brand operating system. As additional examples, the invention may be used to facilitate installation of software products that are in the form of patches, such as an Age of Empires program module patch, and Close Combat—ABTF program module patches, all of which are available from Microsoft Corporation, and all of which operate in the WINDOWS brand operating system. The present invention is suitable for facilitating installation of many other software products, which may be collections of files and program modules that cooperate to provide computer program or patches.

Turning now to the drawings, where like numbers reference like parts in the several figures, an exemplary embodiment of the present invention will be described.

Exemplary Operating Environment

Figure 1:
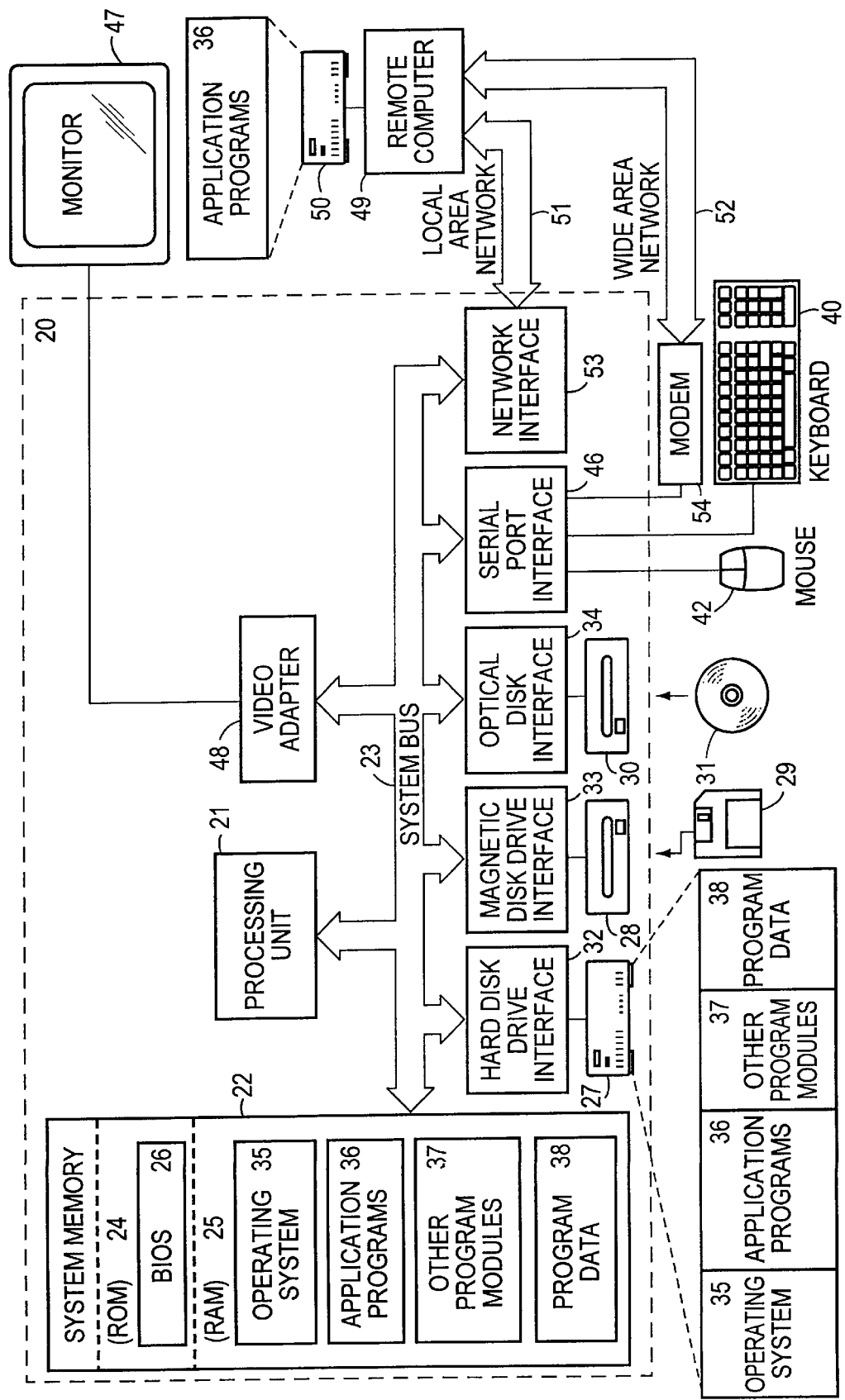
FIG. 1 is a block diagram of a personal computer that provides the operating environment for the exemplary embodiment of the present invention.

FIG. 1 and the following discussion are intended to provide a brief, general description of a suitable computing environment in which the invention may be implemented. Whereas the invention will be described in the general context of the installation of an application program or patch that runs on an operating system in conjunction with a personal computer, those skilled in the art will recognize that the invention also may be implemented to install other types of software for use in other environments. Whereas the invention will be described with reference to files, those skilled in the art will appreciate that the term "file" may correspond to a collection of computer readable information or data, or the like, and that a file may or may not contain computer executable instructions. Although not required, the invention will be described in the general context of computer-executable instructions, such as program modules, being executed by a personal computer. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. That is, whereas the exemplary embodiment of the present invention is discussed in the context of a WINDOWS brand operating system, those skilled in the art will appreciate that the present invention can be practiced with other operating systems, or the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical storage media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable storage media provide nonvolatile storage for the personal computer 20. Although the description of computer-readable storage media above refers to a hard disk, a removable magnetic disk and a CD-ROM disk, it should be appreciated by those skilled in the art that other types of storage media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program module data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Embodiments of the Present Invention

The present invention is directed toward a method for installing a software product on a computer, such as the computer 20 (FIG. 1). Those skilled in the art will appreciate that a software product may be a collection of files and program modules that cooperate to provide a computer program or patch. In accordance with the exemplary embodiment of the present invention, an executable file, which may be referred to as the initial executable file, contains the software materials necessary for the installation of the software product on the computer 20. The initial executable file may be placed in storage media readable by the computer 20. For example, the initial executable file may be transferred from a source, such as a website on the Internet, to the storage media readable by the computer 20. Once in the storage media of the computer 20, the initial executable file may be executed. Once executed, the initial executable file provides means that search for and use only a small amount of a temporary storage space portion of the storage media readable by the computer 20, install the software product in a target storage space portion of the storage media readable by the computer 20, and thereafter clean-up the temporary storage space.

More specifically, a shell program module originates from the initial executable file in response to selection of the initial executable file. The shell program module is preferably executed in a multitasking operating system, and those skilled in the art will appreciate that a multitasking operating system allows a program module to run in either the foreground or the background. Initially the shell program module runs in the foreground and extracts a compressed file from the initial executable file. Thereafter, the shell program module decompress an executable file, such as a setup.exe file, from the compressed file. Thereafter, the shell program module causes a setup program module that originates from the setup.exe file to be executed. The shell program module switches from executing in the foreground to executing in the background as soon as the setup program module is executed, and the setup program module is executed in the foreground. The setup program module sets up the software product, which includes the process of sequentially decompressing and processing files from the compressed file. Once the execution of the setup program module is complete, the shell program module switches from executing in the background to the foreground. Thereafter, the shell program module at least partially cleans up the computer's storage space, for example by deleting the compressed file.

Exemplary Arrangement of Data and Information

Figure 2:
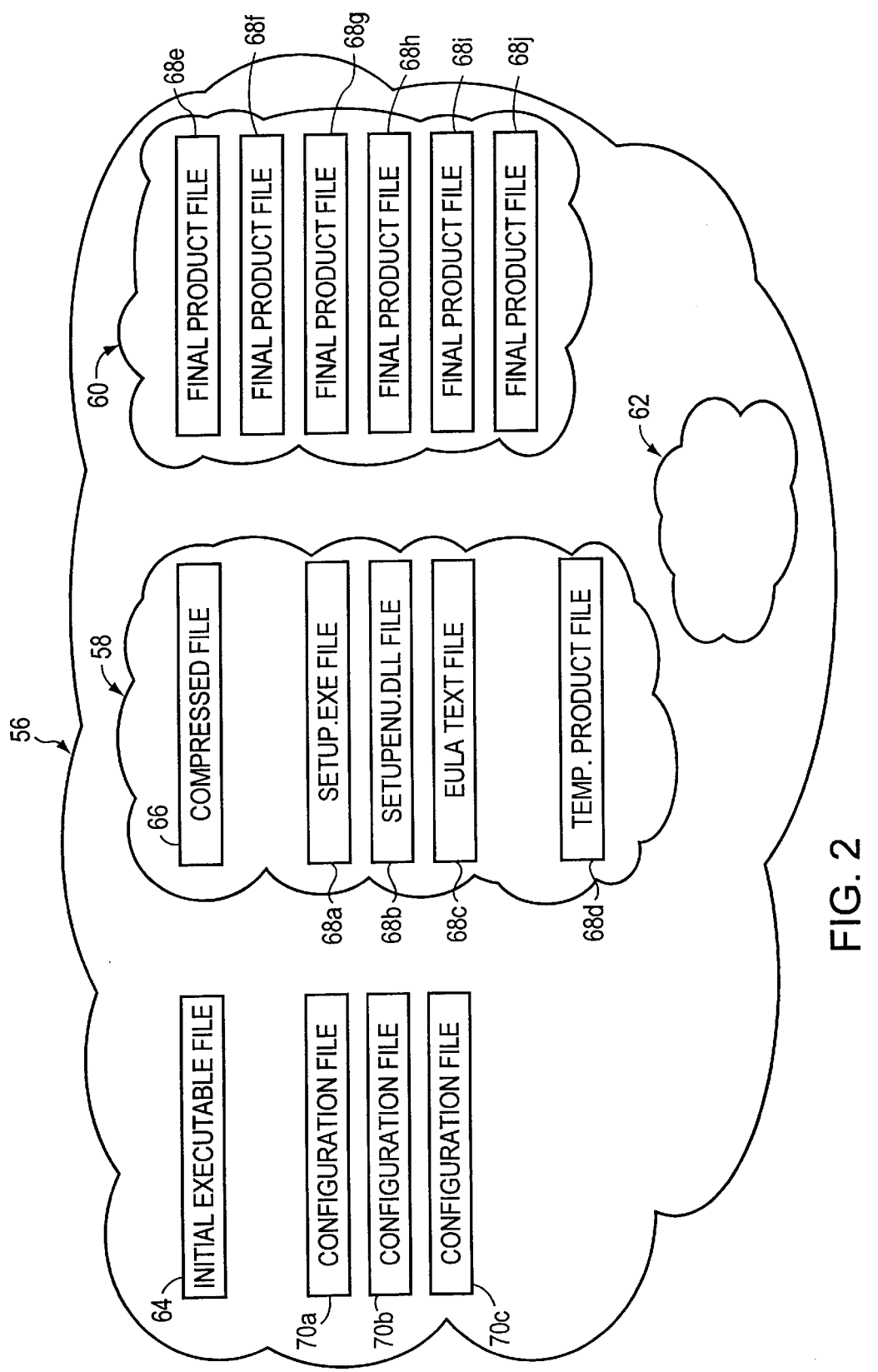
FIG. 2, which diagrammatically illustrates an exemplary arrangement of files on a computer readable storage media, is illustrative of an intermediate phase of installing a software product, in accordance with the exemplary embodiment of the present invention.

FIG. 2 diagrammatically illustrates an exemplary arrangement of data and information on storage media 56 of the personal computer 20 (FIG. 1). The data and information on the storage media is illustrated, for example, in the form of multiple files, which are discussed in greater detail below. The files illustrated in FIG. 2 are associated with the installation of a software product, such as a computer program module or patch, on the computer. The illustrated arrangement of files is representative of an intermediate stage in the process of installing the software product.

The storage media 56 is preferably any kind of storage media that can be written to, such as the hard disk drive 27 (FIG. 1) or the magnetic disk drive 28 (FIG. 1), or a combination of those drives or multiple of those drives, or the like. The storage media 56 may include numerous sections; however, only a few sections are illustrated in FIG. 2. For example, one section may be a temporary storage space, which may be referred to as, or may be in the form of, a temporary directory 58. Further, another section may be a target storage space, which may be referred to as, or be in the form of, a target directory 60. Another section may be referred to as, or be in the form of, an additional directory 62.

Included on the storage space 56 is an executable file, which is referred to as the initial executable file 64, that contains software materials necessary for the installation of the software product on the computer 20 (FIG. 1). The initial executable file 64 may have been transferred from a source, such as a website on the Internet, to the storage media 56. More specifically, the file 64 may have been downloaded from the remote computer 49 (FIG. 1) by way of the WAN 52 and the modem 54 or an ISDN line, or the like.

The initial executable file is the source of a compressed file 66 and a shell program module. The compressed file 66 contained by the initial executable file is the source of multiple files 68*a*–*j*, which are discussed in greater detail below, that are compressed into the compressed file during the original creation of the compressed file. That compression can be facilitated by a utility program module or runtime library, or the like.

Initial Execution of the Shell Program Module

While the initial executable file 64 is in the storage media 56, a person using the computer can conventionally select the initial executable file, and selection of the initial executable file initiates execution of the shell program module that originates from the initial executable file. The operating system in which the shell program module is running is preferably multitasking, and those skilled in the art will appreciate that a multitasking operating system allows a program module to run in either the foreground or the background. The shell program module initially runs in the foreground.

The shell program module causes the storage media 56 to be searched for sufficient storage space to accommodate the compressed file 66 and the files 68*a*–*d*. As will be discussed in greater detail below, in accordance with an exemplary alternative embodiment, which may be the most preferred embodiment, the file 68*d* is not placed in the temporary directory 58, in which case the shell program module causes the storage media 56 to be searched for sufficient storage space to accommodate the compressed file 66 and the files 68*a*–*c*.

The searching of the storage media 56 is carried out by a "search module" of the shell program module. The search module causes the search for sufficient storage space to begin in a predefined location, such as a temporary directory that is established by the operating system. In accordance with the exemplary embodiment of the present invention, the temporary directory 58 is the predefined location. If there is insufficient space in the temporary directory 58, the various paths, which identify the sections of the storage media 56, are sequentially searched for sufficient storage space, until sufficient storage space is located or all of the storage space has been searched. For example, if insufficient space were located in the temporary directory 58, the additional directory 62 would have been searched to see if it had sufficient space, as discussed in greater detail below. An error message is displayed and execution of the shell program module is terminated if sufficient storage space is not located anywhere in the storage media 56. The operation of the search module of the shell program module is discussed in greater detail below.

In accordance with the exemplary embodiment of the present invention, sufficient storage space is available in the temporary directory 58. Subsequent to verifying that sufficient space is available in the temporary directory 58, the shell program module extracts the compressed file 66 from the initial executable file 64 and places the compressed file in the temporary directory. More specifically, the compressed file 66 is loaded into RAM (FIG. 1) from the initial executable file 64, and one megabyte at a time is read from memory and copied to the temporary directory 58 until the entire compressed file is in the temporary directory. The data and information within the initial executable file 64 that define the compressed file are locked while the compressed file 66 is loaded into RAM, and the data and information within the initial executable file 64 that define the compressed file are unlocked after the entire compressed file is in the temporary directory. Thereafter, the shell program module calls a decompression module to decompress an executable file, such as a setup.exe file 68a, and files associated with the setup.exe file, such as a setupenu.dll file 68b and optionally an End User License Agreement (EULA) text file 68c, from the compressed file 66. Those compressed files are placed with the compressed file 66 in the temporary directory 58. The decompression module is discussed in greater detail below.

Execution of the Setup Program Module

The shell program module initiates execution of the setup program module, which originates from the setup.exe file 68a. The shell program module switches from executing in the foreground to executing in the background as soon as the setup program module is executed, and the setup program module is executed in the foreground.

The setup program module may utilize the EULA text file 68c to present an End User License Agreement to the user by way of the monitor 47 (FIG. 1), and at least partially utilizes the setupenu.dll file 68b as a storage medium for resources, such as text, dialogs, art and the like, that are displayed on the monitor during execution of the setup program module to guide the user through the process of setting up the software product. The setup program module creates a directory tree in the target directory 60, which may have been identified by the user in response to prompting by the setup program module. Thereafter, the setup program module calls a decompression module to sequentially decompress additional files from the compressed file. The decompression module is discussed in greater detail below.

During and as a result of execution of the setup program module, a newly decompressed file, which may be referred to as the temporary product file 68d, is initially placed in the temporary directory 58, and the decompressing from the compressed file 66 is paused until that newly decompressed file is copied to the target directory 60. Along with being copied to the target directory, the temporary product file 68d may be renamed. After a temporary product file has been copied to the target directory 60, it may be referred to as a final product file, and several final product files 68e–j are illustrated in FIG. 2.

After the temporary product file 68d is copied from the temporary directory 58 to the target directory 60, where it is referred to as a final product file, the temporary product file 68d is deleted from the temporary directory. This decompression of files from the compressed file 64 by the setup program module is repeated until all of the desired final product files originating from the compressed file 66 are properly stored in their respective directory of the directory tree created in the target directory 60, so that a tree of final product files is in the target directory.

In accordance with the exemplary alternative embodiment, there are no temporary product files 68d placed in the temporary directory 58, because when the setup program module calls the decompression module to sequentially decompress files of the software product from the compressed file, the newly decompressed files are placed directly into the target directory 60. Prior to placing a newly decompressed file into the target directory 60, the target directory is scanned to determine if a prior file having the same name as the newly decompressed file is in the target directory. If such a prior file is not located in the target directory 60, the newly decompressed file is placed into the target directory, at which time the newly decompressed file can be characterized as a final product file. If such a prior file is located in the target directory 60, the newly decompressed file is renamed with a temporary name and then placed in the target directory 60 as a temporary product file. (For example, rather than having the temporary product file 68d in the temporary directory 58, that temporary product file 68d could be in the target directory 60.) Then, the version information of the prior file and the newly decompressed file are compared. If the newly decompressed file is newer than the prior file, the prior file is deleted and the newly decompressed file is given the name of the deleted file, at which time the newly decompressed file can be characterized as a final product file. If the newly decompressed file is older than the prior file, the newer file (i.e., the prior file) is used in setting up the software product and the older file (i.e., the newly decompressed file with the temporary name) is not used in setting up the software product. More specifically, if the file with the temporary name is older than the prior file, the file with the temporary name is deleted from the target directory 60.

After the tree of files has been automatically placed in the target directory 60 by the setup program module, the setup program module prepares the data and information on the computer so that the software product defined by the tree of files placed in the target directory 60 by the setup program module will work with the computer and its attached devices. For example, after the setup program module has caused the tree of final product files to be automatically placed in the target directory 60, the setup program module modifies the computer's configuration files, such as the configuration files 70a–c in the storage media 56, or the like, in a conventional manner. After the software product has been set up, the setup program module ceases to run.

Final Execution of the Shell Program Module

The shell program module is being executed in the background during execution of the setup program module. Once the execution of the setup program module is complete, the shell program module switches from executing in the background to the foreground. Thereafter, the shell program module deletes the compressed file 66, the setup.exe file 68a, the setupenu.dll file 68b, and the optional EULA text file 68c from the temporary directory. Thereafter, execution of the shell program module is terminated.

Those skilled in the art will appreciate that the setup program module may cease running because it has been completely executed, or because a user has aborted execution of the setup program module. The shell program module waits for a short interval, such as an interval of about five seconds, to pass after the setup program module is no longer running. This short interval ensures that the setup program module is completely released from RAM 25 (FIG. 1) and its file components are no longer in use or locked by the operating system. Those skilled in the art will appreciate that when an executable file is being executed, the operating system locks that file to prevent any modification or deletion with respect to that file which may cause a fault or error in the execution of the program module.

Search Module

Further regarding the search module of the shell program module, as mentioned above, the search module searches for sufficient space to accommodate the compressed file 66 and the files 68a–d. As also previously mentioned, in accordance with the exemplary alternative embodiment, the file 68d is not placed in the temporary directory 58, in which case the search module of the shell program module causes the storage media 56 to be searched for sufficient storage space to accommodate the compressed file 66 and the files 68a–c.

Regarding the searching in greater detail, whether there is sufficient space is determined by considering not only the total number of bytes of the compressed file 66 and the files 68a–d or 68a–c, but also the number of clusters that are required to accommodate those files. Those skilled in the art will appreciate that a cluster is a disk-storage unit consisting of a fixed number of sectors, which are storage segments on the disk, that the operating system uses to read or write information. Clusters are considered because an operating system, such as the WINDOWS brand operating system, writes out a file to the end of a cluster boundary. For example, it is common for a cluster to be 4 kilobytes. Therefore, if three files are to be copied to a disk drive containing 12 kilobytes and three clusters, and the first file is 4 kilobytes, the second file is 2 kilobytes, and the third file is 6 kilobytes, the copying would fail. The failure would occur because the first file requires one cluster, the second file requires one cluster, and the third file requires two clusters, but there are only three clusters in the directory. Four clusters, for a total of 16 kilobytes, are required in a single directory which is to accommodate the three files. That is, the number of clusters required for receiving a group of files can be calculated by summing the number of clusters required for each individual file. The number of clusters required for an individual file can be determined by dividing the size of the file by the cluster size, and rounding the quotient up to the nearest whole number.

In accordance with the exemplary embodiment, whether there is sufficient space on the disk drive being considered is determined by calling a routine of the operating system. More specifically, when the shell program module is operating under the WINDOWS 95 brand Operating System, a call is made to the "GetDiskFreeSpace" routine of the operating system, which provides an indication of the bytes and clusters available for a specified path. When the shell program module is operating under the WINDOWS NTSF brand or a FAT32 operating system, a call is made to the "GetDiskFreeSpaceEx" routine of the operating system, which is an extended version of the "GetDiskFreeSpace" routine that is capable of determining the number of bytes available for a path associated with a disk drive larger than two gigabytes. The "GetDiskFreeSpaceEx" routine provides an indication of the bytes available for a specified path. The number of clusters available is determined by dividing the number of bytes available in the path by 4 kilobytes, based upon the assumption that the cluster size is 4 kilobytes.

Decompression Module

Regarding the above-mentioned compression and decompressions with respect to the compressed file 66, those skilled in the art will appreciate that there are numerous compression and decompression utilities that are available and could be used to provide for the aforementioned compression and decompression. As one acceptable example, the above mentioned decompressions from the compressed file 66 can be facilitated with one or more decompression modules, which may be included in a run-time decompression library that is linked into the shell program module and setup program module, or more specifically is linked to the initial executable file 64 and the setup.exe file 68a.

More specifically, the compressed file 66 contains a header that includes identifying information for each file that has been compressed into the compressed file. The identifying information can include, for example, the name and location, within the compressed file, of each file that has been compressed. Each file name listed in the header of the compressed file is sequentially identified in response to the execution of one or more of the decompression modules, and a query is performed for each of those file names to determine if the same file name is included in a list of file names associated with the linked program module or file. If the same file name is included in each list, the corresponding file is decompressed from the compressed file 66 and assigned that file name.

In the exemplary embodiment of the present invention, the list of file names included in the initial executable file 64 contains the names of the setup.exe file 68a, the setupenu.dll file 68b, and the EULA text file 68c, whereby those files are decompressed from the compressed files 66 during execution of the shell program module. Also, the list of names included in the setup.exe file 68a contains the names of all of the files that are decompressed from the compressed file 66 in response to execution of the setup program module.

Methods of the Exemplary Embodiment

Figure 3:
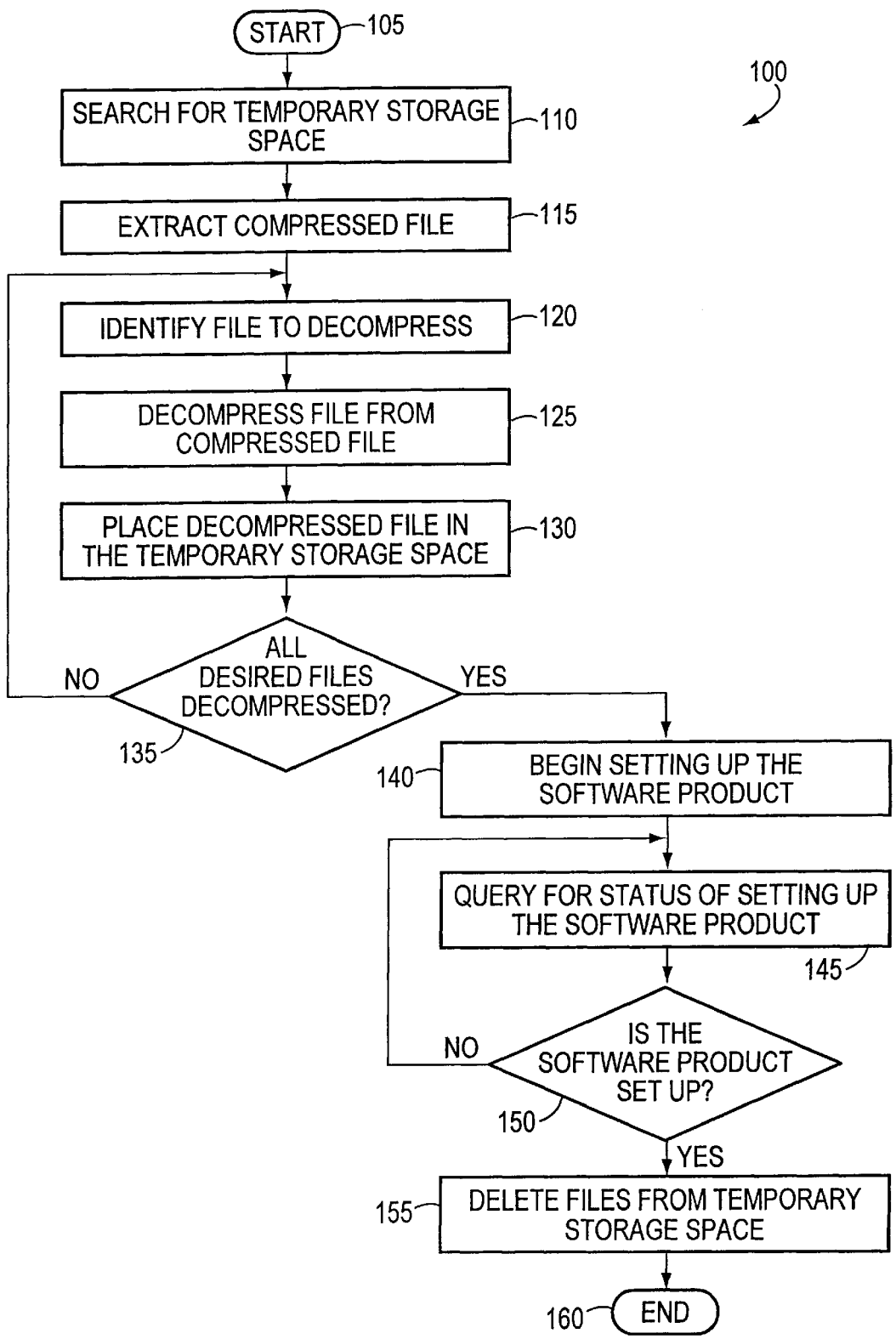
FIG. 3 is a flow diagram illustrating an exemplary method for installing a software product.
Figure 4A:
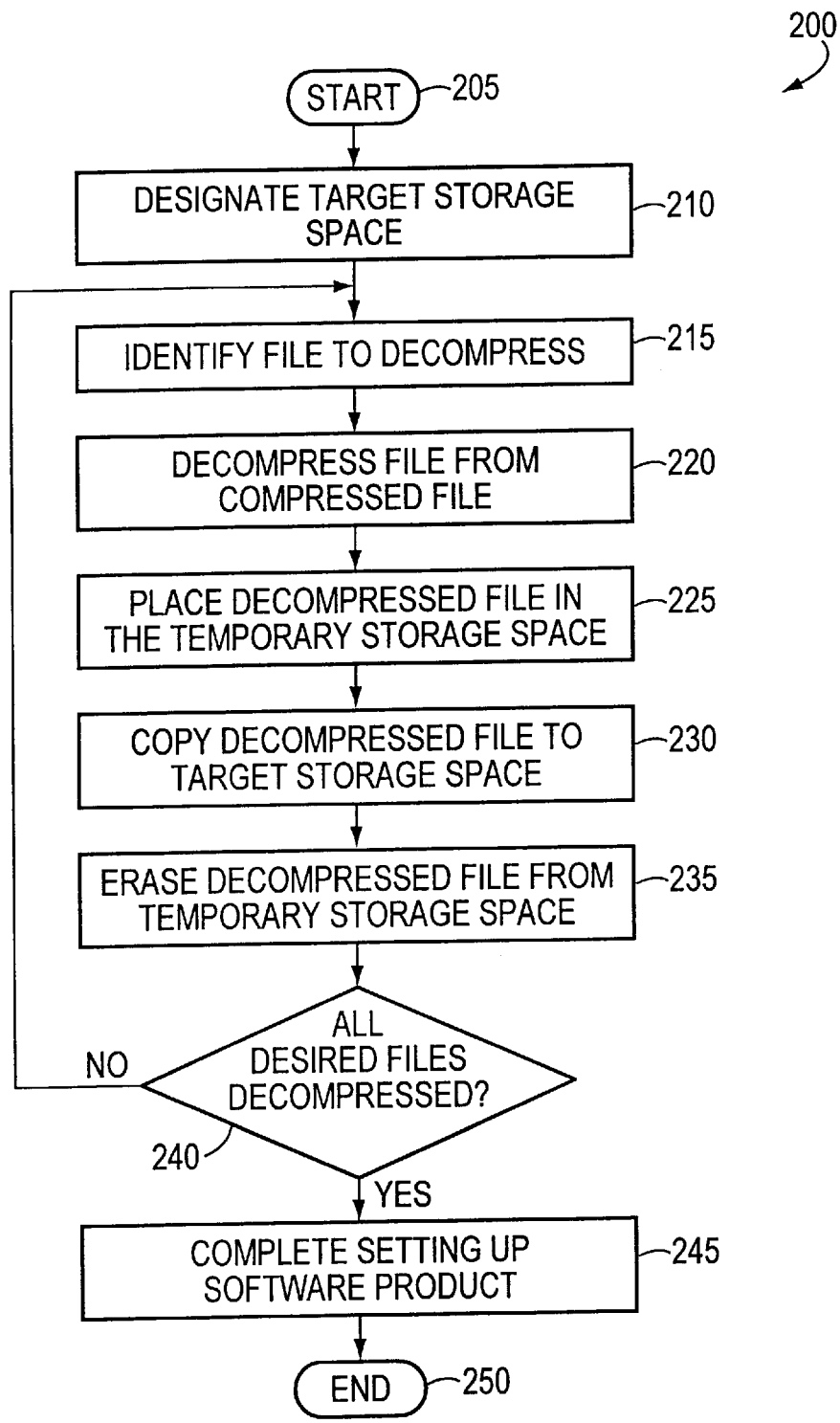
FIG. 4A is a flow diagram illustrating an exemplary method for setting up the software product.
Figure 4B:
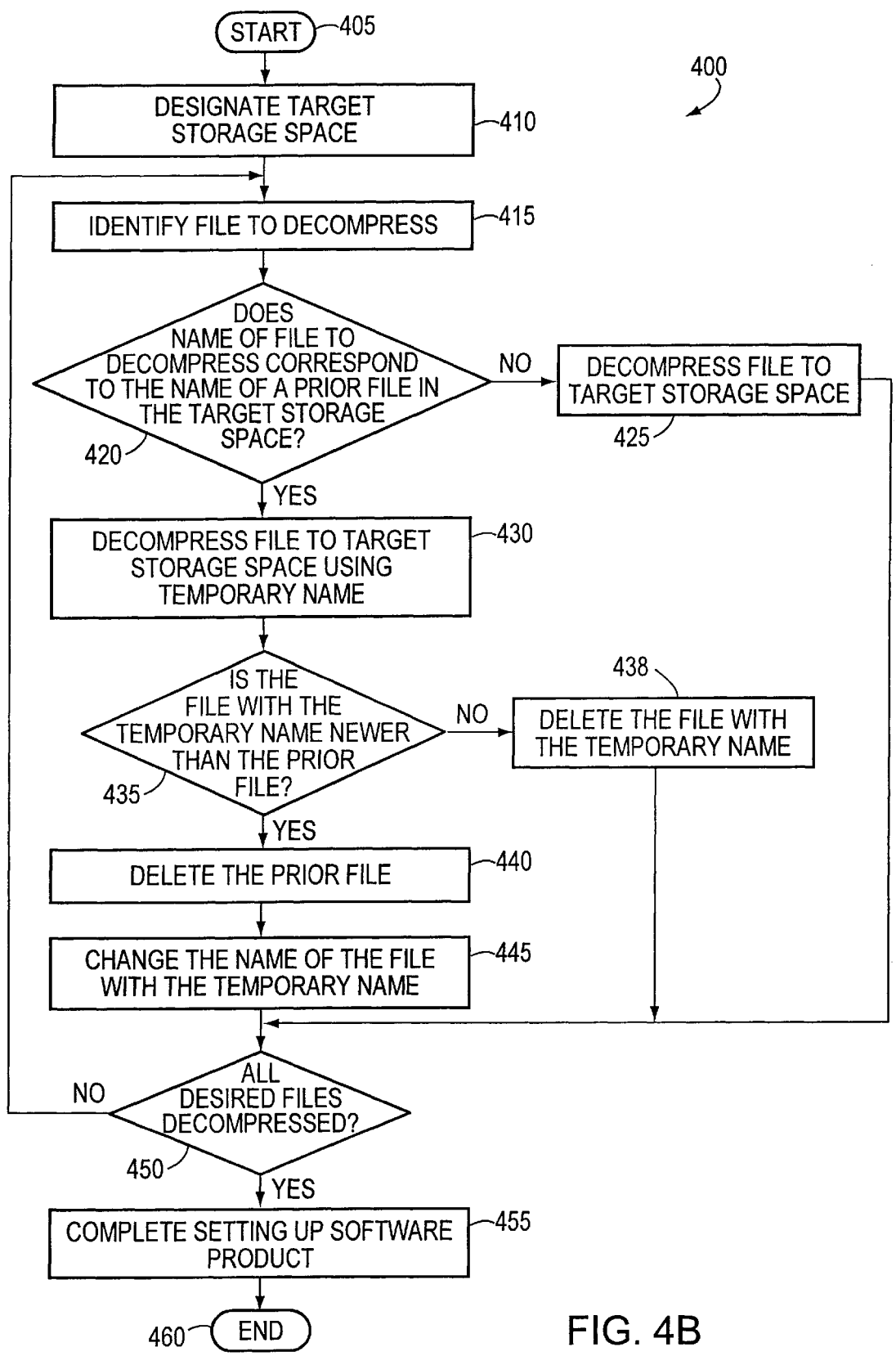
FIG. 4B is a flow diagram illustrating an exemplary alternative method for setting up the software product.
Figure 5:
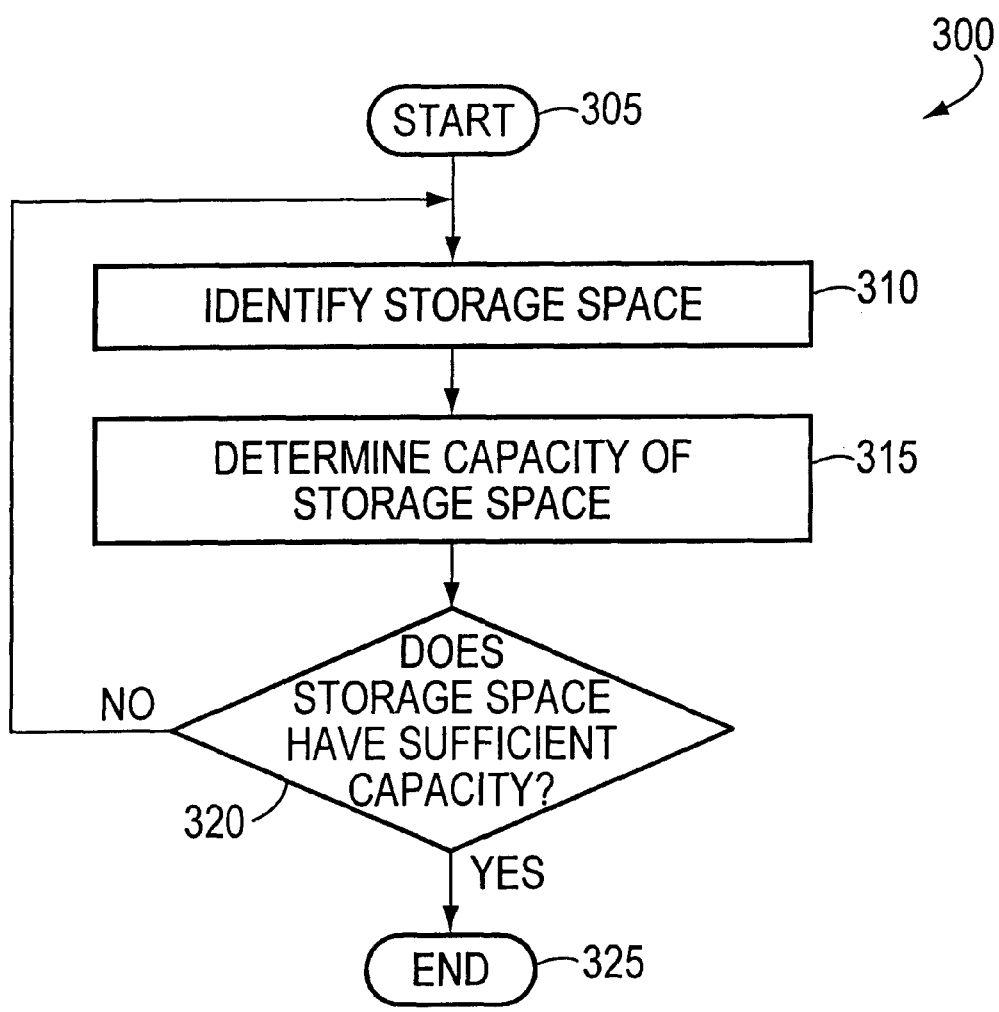
FIG. 5 is a flow diagram illustrating an exemplary method for searching for sufficient temporary storage space for receiving files in the process of installing the software product.

An exemplary method of installing and setting up a software product, such as a software program module or patch, or the like, is illustrated in conjunction with the above-discussed FIG. 2 and the flow diagrams of FIGS. 3–5.

Exemplary Method for Installing the Software Product

Turning now to FIG. 3, and with occasional reference to FIG. 2, an exemplary method 100 for installing the software product will be described. Those skilled in the art will appreciate that the method 100 may be carried out by the above-discussed shell program module, which runs in response to the execution of the initial executable file 64, but that the method 100 is not limited to the shell program module.

The method 100 begins at the step 105 and proceeds to the step 110, where the storage media 56 is searched for a section having sufficient storage space to accommodate the compressed file 66 and the files 68a–d (or the files 68a–c, in accordance with the exemplary alternative embodiment). The step 110 is carried out in accordance with an exemplary method 300 for searching for sufficient storage space, which is discussed in greater detail below with reference to FIG. 5. The method 300 may be carried out at least in part by the above-discussed search module of the shell program module, which runs in response to the execution of the initial executable file 64. Those skilled in the art will also appreciate that the method 300 may be facilitated by a different program module or modules, or the like.

In accordance with the exemplary method 100, control is transferred from the step 110 to the step 115, in response to a determination at the step 110 that sufficient storage space is available in a section of the storage media 56, such as in the storage space which may be referred to as the temporary directory 58. At the step 115, the compressed file 66 is extracted from the initial executable file 64 and placed in the temporary directory 58. After the completion of the step 115, control is transferred to the step 120.

The steps 120, 125 and 135 of the method 100 cooperate to facilitate decompression of an executable file, such as the setup.exe file 68*a*, and files associated with the setup.exe file 68*a*, such as the setupenu.dll file 68*b* and optionally the EULA text file 68*c*, from the compressed file 66. Those skilled in the art will appreciate that there are conventional decompression utilities that are available and could be used to provide for the decompression of the setup.exe file 68*a*, the setupenu.dll file 68*b*, and the optional EULA text file 68*c*.

In accordance with the exemplary method 100, at the step 120 a file to be decompressed from the compressed file 66 is identified. More specifically, at the step 120 a query is made to identify a file name listed in the header of the compressed file 66, and in response to that query, a query is made to determine if the same file name is included in the list of file names associated with the initial executable file 64. If the same file name is included in each list there is a "match" and control is transferred to the step 125. If a match is not obtained, control remains at the step 120 and another query is made to identify the next file name listed in the header of the compressed file 66, and in response to that query, a query is made to determine if the same file name is included in the list of file names associated with the initial executable file 64. This querying continues until a "match" is noted, and thereafter control is transferred to the step 125.

At the step 125, the file corresponding to the name most recently identified at the step 120 is decompressed from the compressed file 66, and thereafter control is transferred to the step 130. At the step 130, the file decompressed at the step 125 is placed in the section of the storage media 56 identified at the step 110, which in accordance with the exemplary method 100 is the temporary directory 58, and thereafter control is transferred to the step 135.

At the step 135, a determination is made as to whether all of the desired files have been decompressed from the compressed file 66. If all of files to be decompressed in association with the steps 120–125 have been decompressed, control is transferred to the step 140. Otherwise, control is transferred back to the step 120. In accordance with the exemplary method 100, the determination at the step 135 is based upon whether all of the necessary queries have been made such that all of the matches possible between the lists in the compressed file 66 and the initial executable file 64 have been previously identified. For example, if the list of names contained in the header of the compressed file 66 has been completely passed through and compared to the list of file names in the initial executable file 64, as a result of the repeated performance of the step 110, control is transferred to the step 140. In contrast, if the list of file names contained in the header of the compressed file 66 has not been completely passed through and compared to the list of file names in the initial executable file 64, as a result of the repeated performance of the step 110, control is transferred back to the step 120. When control is transferred back to the step 120, the querying for a match between the list of file names in the header of the compressed file 66 and the initial executable file 64 does not begin anew. That is, provisions are made so that files previously decompressed due to the performance of the steps 120–125 are not again decompressed.

In accordance with the exemplary embodiment of the present invention, the list of file names in the initial executable file 64 may first include the setup.exe file 68*a*, then the setupenu.dll file 68*b*, and then the EULA text file 68*c*. As a result, the first time the steps 120–130 are passed through, the setup.exe file 68*a* is decompressed from the compressed file 66 and placed in the temporary directory 58; the second time the steps 120–130 are passed through the setupenu.dll file 68*b* is decompressed from the compressed file and placed in the temporary directory; and the third and final time the steps 120–130 are passed through the EULA text file 68*c* is decompressed from the compressed file and placed in the temporary directory.

At the step 140, the setting up of the software product is initiated. The setting up of the software product is carried out in accordance with an exemplary method 200 or an exemplary method 400 for setting up the software product, which are discussed below with reference to FIGS. 4A and 4B, respectively. Those skilled in the art will appreciate that the methods 200 and 400 may be carried out at least in part by the above-discussed setup program module, which runs in response to the execution of the setup.exe file 68*a*. Those skilled in the art will also appreciate that the methods 200 and 400 may be facilitated by a different program module or modules, or the like.

In accordance with the exemplary embodiment of the present invention where the method 100 is carried out by the shell program module and the method 200 or the method 400 is carried out by the setup program module, the shell program module is executed in the foreground throughout the steps 110–140. At the step 140, the shell program module initiates execution of the setup program module in the foreground, and the shell program module transitions from executing in the foreground to executing in the background. The shell program module is executed in the background during the steps 145 and 150. The shell program module transitions from executing in the background to executing in the foreground when control is transferred to the step 155, which occurs after execution of the setup program ceases. This transition may not be visible to the user because the shell program runs hidden from the user.

The steps 145 and 150 may be described in the context of querying. For example, as illustrated in FIG. 3, a query is performed at the step 145 to determine if the software product is still being set up. If it is determined at the step 150 that the software product is still being setup, control is transferred back to the step 145. If it is determined at the step 150 that the setting up of the software product is complete, control is transferred to the step 155.

In contrast, where the operating system is multitasking and the method 100 is carried out by the shell program module while the method 200 or 400 is carried out by the setup program module, the steps 145 and 150 may be handled differently. That is, the operating system may automatically control the transitioning of the shell program module between the foreground and the background. That is, the shell program module may instruct the operating system to place the shell program module in the background while the setup program module is executed in the foreground. The shell program module may further instruct the operating system to place the shell program module in the foreground after the setup program module has been executed.

At the step 155, a short interval is provided, such that an interval of about five seconds passes after detecting that the setup program module is no longer running. This short interval seeks to ensure that the setting up of the software product is complete. Thereafter, and further at the step 155, any files copied to the section of the storage media 56 selected during the step 110, such as the temporary directory 58, are deleted. Thereafter, control is transferred to the step 160 to end the method 100.

Exemplary Method for Setting Up the Software Product

Turning now to FIG. 4A, and with occasional reference to FIG. 2, the exemplary method 200 for setting up the software product will be described. The method 200 begins at the step 205 and proceeds to the step 210. At the step 210, the section of the storage media 56 in which the software product is to be installed is identified, which in accordance with the exemplary method 200 is the storage space referred to as the target directory 60. Further, at the step 210 a directory tree may be established within the target directory 60 for receiving the files of the software product. Thereafter, control is transferred to the step 215.

The steps 215, 220 and 240 of the method 200 cooperate to decompress numerous temporary product files (for example see the temporary product file 68d) from the compressed file 66. Those skilled in the art will appreciate that there are conventional decompression utilities, and the like, that are available and could be used to provide for the decompression of the temporary product files.

In accordance with the exemplary method 200, at the step 215 a file to be decompressed from the compressed file 66 is selected. More specifically, at the step 215 a query is made to identify a file name listed in the header of the compressed file 66, and in response to that query, a query is made to determine if the same file name is included in the list of file names in the setup.exe file 68a. If the same file name is included in each list there is a "match" and control is transferred to the step 220. If a match is not obtained control is maintained at the step 215, and another query is made to identify the next file name listed in the header of the compressed file 66, and in response to that query, a query is made to determine if the same file name is included in the list of file names included in the setup.exe file 68a. This querying continues until a "match" is noted, and thereafter control is transferred to the step 220.

At the step 220, the file corresponding to the name most recently identified at the step 215 is decompressed from the compressed file 66, and thereafter control is transferred to the step 225. At the step 225, the file decompressed at the step 220 is placed in the section of the storage media 56 identified at the step 115, which in accordance with the exemplary method 100 is the temporary directory 58, and thereafter control is transferred to the step 230.

At the step 230, the file decompressed at the step 220 and placed in the temporary directory 58 at the step 225 is copied from the temporary directory 58 to the section of the storage media 56 identified at the step 210, which in accordance with the exemplary method 200 is the storage space referred to as the target directory 60. Additionally, along with being copied to the target directory 60 the decompressed file may be renamed, and it may further be decompressed if it was in a compressed form while in the temporary directory 58. Any files decompressed at the step 220 and placed in the temporary directory 58 in a compressed form are preferably individually compressed files, meaning that each, upon being decompressed, provides a single decompressed file. Any files that are decompressed in association with the step 230 may be decompressed by a conventional decompression module. Further, if a directory tree was established at the step 210, the file copied to the target directory 60 by the step 230 may be placed in a predetermined position in the directory tree.

Control is transferred from the step 230 to the step 235, where the file decompressed at the step 220 and placed in the temporary directory 58 at the step 225 is deleted from the temporary directory 58. Thereafter, control is transferred to the step 240.

At the step 240, a determination is made as to whether all of the desired files have been decompressed from the compressed file 66. If all of the files to be decompressed from the compressed file 66 by the steps 215–235 have been decompressed, control is transferred to the step 245, whereas if all of the files to be decompressed from the compressed file 66 by the steps 215–235 have not been decompressed, control is transferred back to the step 215. In accordance with the exemplary method 200, the determination at the step 240 is based upon whether all of the necessary queries have been made such that all of the matches possible between the lists of file names in the compressed file 66 and the setup.exe file 68a have been previously identified. For example, if the list of names contained in the header of the compressed file 66 has been completely passed through and compared to the list of file names in the setup.exe file 68a, as a result of the repeated performance of the step 215, control is transferred to the step 245. In contrast, if the list of file names contained in the header of the compressed file 66 has not been completely passed through and compared to the list of file names in the setup.exe file 68a, as a result of the repeated performance of the step 215, control is transferred back to the step 215. When control is transferred back to the step 215, the querying for a match between the list of file names in the header of the compressed file 66 and the list of file names in the setup.exe file 68a does not begin anew. That is, provisions are made so that files previously decompressed due to the performance of the steps 215–240 are not again decompressed.

In accordance with the exemplary embodiment of the present invention, the list of file names in the setup.exe file 68a includes the names of all of the files of the software product that must be present for operation of the software product. As a result, the first time the steps 215–240 are passed through, a first file of the software product is decompressed from the compressed file 66 and placed in the temporary directory 58; the second time the steps 215–240 are passed through a second file of the software product is decompressed from the compressed file and placed in the temporary directory; the third time the steps 215–240 are passed through the third file of the software product is decompressed from the compressed file and placed in the temporary directory; and so on, until all of the files of the software product have been sequentially placed into and removed from the temporary directory.

After it is determined at the step 240 that all of the files of the software product have been decompressed from the compressed file 66, control is transferred to the step 245. At the step 245, any additional data and information on the computer is prepared, in a conventional manner, so that the software product will work with the computer 20 and its attached devices. For example, the computer's configuration files, such as the configuration files 70a–c, or the like, may be modified in a conventional manner. Thereafter, control is transferred to the step 250, which ends the method 200.

Exemplary Alternative Method for Setting Up the Software Product

Turning now to FIG. 4B, and with occasional reference to FIG. 2, the exemplary method 400 for setting up the software product will be described. The method 400 begins at the step 405 and proceeds to the step 410. At the step 410, the section of the storage media 56 in which the software product is to be installed is identified, which in accordance with the exemplary method 400 is the storage space referred to as the target directory 60. Further, at the step 410, a directory tree may be established within the target directory 60 for receiving the files of the software product. Thereafter, control is transferred to the step 415.

At the step 415, a file to be decompressed from the compressed file 66 is selected. More specifically, at the step 415 a query is made to identify a file name listed in the header of the compressed file 66, and in response to that query, a query is made to determine if the same file name is included in the list of file names in the setup.exe file 68a. If the same file name is included in each list there is a "match" and control is transferred to the step 420. If a match is not obtained, control is maintained at the step 415, and another query is made to identify the next file name listed in the header of the compressed file 66, and in response to that query, a query is made to determine if the same file name is included in the list of file names included in the setup.exe file 68a. This querying continues until a "match" is noted, and thereafter control is transferred to the step 420.

At the step 420, a query is performed to see if the section of the storage media 56 identified at the step 410, which in accordance with the exemplary method 400 is the storage space referred to as the target directory 60, contains a file with the same name as the file most recently identified at the step 415. If a negative determination is made at the step 420, control is transferred to the step 425. At the step 425, the file corresponding to the name most recently identified at the step 415 is decompressed from the compressed file 66 and placed in the section of the storage media 56 identified at the step 410, which in accordance with the exemplary method 400 is the storage space referred to as the target directory 60. Thereafter, control is transferred to the step 450, which is discussed in greater detail below.

If a positive determination is made at the step 420, control is transferred to the step 430. At the step 430, the file corresponding to the name most recently identified at the step 415 is decompressed from the compressed file 66, renamed with a temporary name, and then placed in the section of the storage media 56 identified at the step 410, which in accordance with the exemplary method 400 is the storage space referred to as the target directory 60. Thereafter, control is transferred from the step 430 to the step 435.

At the step 435, a determination is made whether the renamed file placed in the target directory 60 at the step 430 (i.e., the file with the temporary name) is newer than the prior file in the target directory 60, which was identified at the step 420. If a negative determination is made at the step 435, control is transferred to the step 438. At the step 438, the file with the temporary name is deleted from the target directory 60. That is, if the file with the temporary name is older than the prior file, the prior file is used in setting up the software product and the file with the temporary name is not used in setting up the software product. Control is transferred from the step 438 to the step 450, which is discussed in greater detail below.

If a positive determination is made at the step 435, control is transferred to the step 440. At the step 440, the prior file in the target directory 60, which was identified at the step 420, is deleted, and then control is transferred to the step 445. At the step 445, the file most recently decompressed from the compressed file 66, which was renamed with the temporary name and placed in the target directory 60 at the step 430, is renamed. That file with the temporary name is given the name for which there was a match at the most recent occurrence of the step 415. Thereafter, control is transferred to the step 450.

At the step 450, a determination is made as to whether all of the desired files have been decompressed from the compressed file 66. If all of the files to be decompressed from the compressed file 66 by the steps 415–445 have been decompressed, control is transferred to the step 455. Otherwise, control is transferred back to the step 415. In accordance with the exemplary method 400, the determination at the step 450 is based upon whether all of the necessary queries have been made such that all of the matches possible between the lists of file names in the compressed file 66 and the setup.exe file 68a have been previously identified. For example, if the list of names contained in the header of the compressed file 66 has been completely passed through and compared to the list of file names in the setup.exe file 68a, as a result of the repeated performance of the step 415, control is transferred to the step 455. In contrast, if the list of file names contained in the header of the compressed file 66 has not been completely passed through and compared to the list of file names in the setup.exe file 68a, as a result of the repeated performance of the step 415, control is transferred back to the step 415. When control is transferred back to the step 415, the querying for a match between the list of file names in the header of the compressed file 66 and the list of file names in the setup.exe file 68a does not begin anew. That is, provisions are made so that files previously decompressed due to the performance of the steps 415–445 are not again decompressed.

In accordance with the exemplary alternative embodiment of the present invention, the list of file names in the setup.exe file 68a includes the names of all of the files of the software product that must be present for operation of the software product. As a result, the first time the steps 415–445 are passed through, a first file of the software product is decompressed from the compressed file 66 and placed in the target directory 60; the second time the steps 415–445 are passed through a second file of the software product is decompressed from the compressed file and placed in the target directory; the third time the steps 415–445 are passed through the third file of the software product is decompressed from the compressed file and placed in the target directory; and so on, until all of the files of the software product have been sequentially placed into the target directory.

After it is determined at the step 450 that all of the files of the software product have been decompressed from the compressed file 66, control is transferred to the step 455. At the step 455, any additional data and information on the computer is prepared, in a conventional manner, so that the software product will work with the computer 20 and its attached devices. For example, the computer's configuration files, such as the configuration files 70a–c, or the like, may be modified in a conventional manner. Thereafter, control is transferred to the step 460, which ends the method 400.

Exemplary Method for Searching for Temporary Storage Space

Turning now to FIG. 5, and with occasional reference to FIG. 2, the exemplary method 300 for searching for sufficient storage space, which is carried out at the step 110 (FIG. 3) of the method 100 (FIG. 3), will be described. The method begins at the step 305 and proceeds to the step 310. At the step 310, a section of storage media 56 is targeted for evaluation, and thereafter control is transferred to the step 315. At the step 315, a determination is made as to the capacity of the section of the storage media 56 targeted at the step 310. In accordance with the exemplary embodiment, it is preferable to determine the number of clusters available in the section of the storage media 56 targeted at the step 310. Step 310 transfers control to the step 320, where a determination is made as to whether the number of clusters identified at the step 315 is at least as large as a predetermined number of clusters, the predetermined number of clusters being the maximum number of clusters of the disk drive containing the temporary directory 58 that are utilized during the methods 100 (FIG. 1), 200 (FIG. 4A) or 400 (FIG. 4B). If it is determined at the step 320 that there is a sufficient number of clusters available in the section of the storage media 56 targeted at the step 310, control is transferred to the step 325. If it is determined at the step 320 that there is an insufficient number of clusters available in the section of the storage media 56 targeted a the step 310, control is transferred to the step 325, so that another pass is made through the steps 310–320.

In accordance with the exemplary method 300, the storage space identified at the step 310 during the first pass through the steps 310–320 is a predetermined location on the storage media 56, such as a disk drive containing the temporary directory 58. During the subsequent passes through the steps 310–320, the step 310 sequentially identifies different sections of the storage media 56. For example, in a second pass through the steps 310–320, the step 310 may identify a different disk drive that contains the additional directory 62.

The invention may conveniently be implemented in modules of computer readable information that are based upon the above disclosure and accompanying drawings. No particular programming language has been described for carrying out the various procedures described above because it is considered that the operations, the steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program module could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims.

What is claimed is:

1. A computer-readable medium having computer-executable instructions for performing steps comprising:

A. executing a shell program module in a foreground mode, wherein the shell program module originates from a first file, and while the shell program module is operating in the foreground mode the shell program module performs the steps comprising:
 1. determining the capacity of a section of storage media,
 2. evaluating whether the capacity of the section of the storage media is at least as large as a predetermined capacity that is representative of the amount of storage media required to accommodate at least a compressed file and a setup program module;
 3. extracting at least the compressed file from the first file,
 4. saving the compressed file in the section of storage media,
 5. decompressing at least the setup program module from the compressed file,
 6. saving the setup program module in the section of storage media; and B. executing the setup program module in the foreground mode in response to execution of the shell program module, wherein the shell program module executes in a background mode during execution of the setup program module, and the setup program module performs the steps comprising:
 1. decompressing a plurality of product files of the software product from the compressed file,
 2. saving the product files in a second directory, and
 3. at least partially setting up the software product using the product files; and C. again executing the shell program module in the foreground mode in response to completion of the execution of the setup program module, wherein after completion of the execution of the setup program module the shell program module performs the steps comprising:
 1. deleting the compressed file from the section of storage media, and
 2. deleting the setup program module from the section of storage media.

2. The method of claim 1, wherein:

the step of decompressing the product files comprises the step of decompressing a first product file, which has a first name; and the setup program module further performs the steps of:
 determining if a second file in a predetermined directory has the first name, and
 deleting the second file in response to determining that the second file has the first name and is older than the first file, and
 saving the first file in the predetermined directory.

3. The method of claim 1, wherein:

the step of decompressing the product files comprises the step of decompressing a first product file, which has a first name; and the setup program module further performs the steps of:
 determining if a second file in a predetermined directory has the first name, and
 in response to determining that the second file has the first name, renaming the first product file and thereafter saving the first product file to the predetermined directory,
 determining if the first file is newer than the second file,
 deleting the second file from the predetermined directory in response to determining that the first file is newer than the second file, and
 assigning the first name to the first file after the step of deleting the second file.

4. A method for installing a software product on a computer, comprising:

executing a shell program module that originates from a first file, wherein the shell program module operates in a foreground mode while performing:
 extracting at least one compressed file from the first file; and decompressing at least a setup program module from the compressed file; and executing the setup program module in response to execution of the shell program module, wherein the setup program module operates in the foreground mode while the shell program module operates in a background mode when the setup program module performs:
  decompressing a plurality of product files of the software product from the compressed file; and
  at least partially setting up the software product using the product files.

5. A computer-readable medium having computer-executable instructions for performing the method of claim 4.

6. A method for installing a software product on a computer, comprising:
  executing a shell program module that originates from a first file, wherein the shell program module performs:
    extracting from the first file at least one compressed file comprising a plurality of product files of the software product;
    saving the compressed file in a first directory; and
    decompressing at least a setup program module from the compressed file; and
  executing the setup program module in response to execution of the shell program module, wherein the setup program module performs:
    sequentially selecting each product file of the plurality of product files and completing the following for the selected product file before selecting the next product file:
      decompressing the selected product file;
      saving the selected product file in the first directory;
      copying the selected product file from the first directory to a second directory; and
      deleting the selected product file from the first directory; and
    at least partially setting up the software product using the product files.

7. A computer-readable medium having computer-executable instructions for performing the method of claim 6.

8. A method for installing a software product on a computer, comprising:
  executing a shell program module that originates from a first file, wherein the shell program module performs:
    determining a capacity of a section of storage media;
    evaluating whether the capacity of the section of the storage media is at least as large as a predetermined capacity that is representative of an amount of storage media required to accommodate at least a compressed file stored in the first file and a setup program module stored in the compressed file;
    extracting the compressed file from the first file;
    saving the compressed file in the section of storage media;
    decompressing the setup program module from the compressed file; and
    saving the setup program module in the section of storage media; and
  executing the setup program module in response to execution of the shell program module, wherein the setup program module performs:
    decompressing a plurality of product files of the software product from the compressed file; and
    at least partially setting up the software product using the product files.

9. The method of claim 8, wherein determining the capacity of the section of storage media comprises determining a number of empty clusters in the section of the storage media, and wherein the predetermined capacity is representative of a number of clusters required to accommodate at least the compressed file and the setup program module.

10. A computer-readable medium having computer-executable instructions for performing the method of claim 9.

11. A computer-readable medium having computer-executable instructions for performing the method of claim 8.

12. A method for installing a software product on a computer, comprising:
  executing a shell program module that originates from a first file, wherein the shell program module operates in a foreground mode while performing:
    extracting at least one compressed file, comprising a plurality of product files of the software product, from the first file; and
    decompressing at least a setup program module from the compressed file; and
  executing the setup program module in response to execution of the shell program module, wherein the setup program module operates in the foreground mode while the shell program module operates in a background mode when the setup program module performs:
    for each product file of the plurality of product files,
      decompressing the product file;
      storing the product file in a predetermined directory;
      determining a filename of the product file;
      determining if a second file in the predetermined directory has the filename and is older than the product file; and
      if the second file has the filename and is older than the product file, then deleting the second file; and
    setting up the software product using the files in the predetermined directory.

13. The method of claim 12, wherein storing the product file in the predetermined directory further comprises:
  if the second file has the filename,
    storing the product file in the predetermined directory under a temporary name; and
    if the second file is older than the product file, then renaming the product file to the filename after deleting the second file.

14. A computer-readable medium having computer-executable instructions for performing the method of claim 13.

15. A computer-readable medium having computer-executable instructions for performing the method of claim 12.

* * * * *